United States Patent
Ounsworth et al.

(10) Patent No.: US 11,909,893 B2
(45) Date of Patent: Feb. 20, 2024

(54) COMPOSITE ENCRYPTION ACROSS CRYPTOGRAPHIC ALGORITHMS

(71) Applicant: Entrust Corporation, Shakopee, MN (US)

(72) Inventors: Michael Ounsworth, Sioux Lookout (CA); John Robert Gray, Nepean (CA); Serge Jean Maurice Mister, Ottawa (CA)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 17/850,712

(22) Filed: Jun. 27, 2022

(65) Prior Publication Data

US 2022/0417037 A1    Dec. 29, 2022

Related U.S. Application Data

(60) Provisional application No. 63/215,230, filed on Jun. 25, 2021.

(51) Int. Cl.
*H04L 9/32* (2006.01)
*H04L 9/30* (2006.01)

(52) U.S. Cl.
CPC ............ *H04L 9/3268* (2013.01); *H04L 9/321* (2013.01); *H04L 9/302* (2013.01); *H04L 9/3093* (2013.01)

(58) Field of Classification Search
CPC ....... H04L 9/3268; H04L 9/321; H04L 9/302; H04L 9/3093
USPC ........................................................ 713/168
See application file for complete search history.

(56) References Cited

U.S. PATENT DOCUMENTS

| | | | |
|---|---|---|---|
| 9,769,151 B2* | 9/2017 | Klieman | H04L 63/0823 |
| 10,374,800 B1* | 8/2019 | Sharifi Mehr | H04L 63/20 |
| 11,632,242 B2* | 4/2023 | Beckwith | G06F 21/602 |
| | | | 380/28 |
| 11,652,644 B1* | 5/2023 | Griffin | H04L 9/3093 |
| | | | 713/176 |
| 2011/0116628 A1* | 5/2011 | Wack | H04L 9/0866 |
| | | | 380/44 |
| 2012/0017086 A1* | 1/2012 | Chu | H04L 63/0823 |
| | | | 713/171 |
| 2014/0289833 A1* | 9/2014 | Briceno | H04L 9/006 |
| | | | 726/5 |
| 2016/0094347 A1* | 3/2016 | Fan | H04L 63/0428 |
| | | | 713/168 |
| 2022/0141039 A1* | 5/2022 | Gray | H04L 63/0823 |
| | | | 713/156 |

(Continued)

OTHER PUBLICATIONS

Aviram, "Combining Secrets in Hybrid Key Exchange in TLS 1.3," https://mailarchive.ietf.org/arch/msg/tls/F4SVeL2xbGPaPB2GW_GkBbD_a5M/, 4 pages (Sep. 1, 2021).

(Continued)

*Primary Examiner* — Thanh T Le
(74) *Attorney, Agent, or Firm* — Merchant & Gould P.C.

(57) ABSTRACT

Content, such as an encryption key, may be transmitted between computing systems that both use more than one encryption algorithm. Secrets may be used to encode the content. The different encryption algorithms may be used to separately encrypt the encoded content and the secrets prior to communicating the encrypted, encoded content and encrypted secrets between computing systems.

21 Claims, 6 Drawing Sheets

(56) References Cited

U.S. PATENT DOCUMENTS

2023/0163966 A1* 5/2023 Garcia Morchon .. H04L 9/0838
713/171

OTHER PUBLICATIONS

Dodis et al., "Chosen-Ciphertext Security of Multiple Encryption," J. Kilian (Ed.): TCC 2005, LNCS 3378, pp. 188-209 (2005).
Harnik et al., "On Robust Combiners for Oblivious Transfer and Other Primitives," R. Cramer (Ed.): Eurocrypt 2005, LNCS 3494, pp. 96-113 (2005).
Stebila, "Revised hybrid key exchange draft," https://mailarchive.ietf.org/arch/msg/tls/GenWgNbYhwkRWNzNvUHIwk1HfWw/, 2 pages (Jan. 11, 2022).
Stebila et al., "Hybrid key exchange in TLS 1.3," https://datatracker.ietf.org/doc/draft-ietf-tls-hybrid-design/, 25 pages (Aug. 28, 2022).
Zhang et al., "On the Security of Multiple Encryption or CCA-security+CCA-security=CCA-security?," F. Bao et al., (Eds.): PKC 2004, LNCS 2947, pp. 360-374 (2004).

* cited by examiner

COMPOSITE ENCRYPTION ACROSS CRYPTOGRAPHIC ALGORITHMS

CROSS-REFERENCE TO RELATED APPLICATIONS

The present application claims priority from U.S. Provisional Patent Application No. 63/215,230, filed on Jun. 25, 2021, the disclosure of which is hereby incorporated by reference in its entirety.

BACKGROUND

A variety of cryptographic algorithms are available for use in computer security systems. These include, for example, symmetric key cryptography systems (e.g., AES), public key cryptography systems, which use a public-private key pair for encrypting and decrypting data (e.g., as in RSA), as well as various hash functions. Various encryption algorithms have been developed in accordance with standards in terms of length (size) of encryption keys, as well as the specific encryption algorithms used. Generally speaking, longer encryption keys and more complex encryption schemes require significantly greater computational resources to "break" the particular encryption scheme used.

The trustworthiness of any individual one of the available cryptographic algorithms is increasingly at question given advances in quantum computing. For example, during the transition to post-quantum cryptography, there will be uncertainty as to the strength of cryptographic algorithms; we will no longer fully trust traditional cryptography such as RSA, Diffie-Hellman, DSA and their elliptic curve variants, but we will also not fully trust their post-quantum replacements until they have had sufficient scrutiny. With widespread adoption of post-quantum cryptography, there will be an enhanced need for an entity to possess multiple public keys that use different cryptographic algorithms. However, detection of which cryptographic algorithm is subject to compromise may prove difficult, and computationally efficient schemes for using multiple such cryptographic algorithms to ensure security in a post-quantum environment remain not widely developed.

SUMMARY

In general terms, the present application is directed to a scheme for managing a composite encryption scheme using a plurality of encryption algorithms. In particular, content, such as an encryption key, may be transmitted between computing systems that both use more than one encryption algorithm by generating secrets that may be used to encode the content, and to separately encrypt the encoded content and the secrets with different ones of the encryption algorithms prior to transport of the encrypted, encoded content and encrypted secrets. Accordingly, all of the encryption algorithms that are used by a transmitting computing system are required to be successfully used for decryption by a receiving computing system so that the secrets may be obtained and the content decoded.

In a first aspect, a method of securing data for transmission between a first computing system and a second computing system is disclosed. The method includes determining, at a first computing system, a number N of different, independent encryption algorithms used at the first computing system and at a second computing system, wherein N is an integer greater than or equal to two, the N encryption algorithms being associated with N encryption keys received in a certificate. The method further includes generating a different secret associated with an associated encryption algorithm for each of N-1 of the N encryption algorithms, thereby forming N-1 secrets, and performing an exclusive-or operation on a combination of the content and the N-1 secrets to form encoded content. The method includes encrypting each of the N-1 secrets with the associated encryption algorithm from among the N-1 encryption algorithms using N-1 encryption keys of the N encryption keys, and encrypting the encoded content with the Nth encryption algorithm using the Nth encryption key. The method also includes transmitting, to the second computing system, a composite encrypted key comprising each of the encrypted N-1 secrets and the encrypted encoded content.

In a second aspect, a composite encryption system includes a first computing system including a processor communicatively coupled to a memory. The memory stores instructions which, when executed by the processor, cause the first computing system to: determine a number N of different, independent encryption algorithms used at the first computing system and at a second computing system, wherein N is an integer greater than or equal to two, the N encryption algorithms being associated with N encryption keys received in a certificate; generate a different secret associated with an associated encryption algorithm for each of N-1 of the N encryption algorithms, thereby forming N-1 secrets; perform an exclusive-or operation on a combination of the content and the N-1 secrets to form encoded content; encrypt each of the N-1 secrets with the associated encryption algorithm from among the N-1 encryption algorithms using N-1 encryption keys of the N encryption keys; encrypt the encoded content with the Nth encryption algorithm using the Nth encryption key; and transmit, to the second computing system, a composite encryptedkey comprising each of the encrypted N-1 secrets and the encrypted encoded content.

In a third aspect, a method of securely transmitting content between a first computing system and a second computing system is disclosed. The method includes receiving, at a second computing system from a first computing system, a composite encryptedkey, the second computing system and the first computing system using a number N of different, independent encryption algorithms using N key pairs, each key pair of the N key pairs including an encryption key and a decryption key, the encryption key of all of the N key pairs being included in a certificate, wherein the composite encryptedkey includes N-1 encrypted secrets and encrypted encoded content and N is an integer greater than or equal to two. The method further includes decrypting, at the second computing system, each of the N-1 secrets with an associated one of N-1 associated encryption algorithms of the N encryption algorithms, wherein decrypting each of the N-1 secrets includes use of N-1 decryption keys. The method also includes decrypting, at the second computing system, the encoded content with a remaining Nth encryption algorithm and Nth decryption key of the N encryption algorithms, and performing, at the second computing system, an exclusive-or operation on the encoded content with each of the N-1 secrets to decode the content.

In a fourth aspect, a system includes a recipient computing system including a processor communicatively coupled to a memory. The memory stores instructions which, when executed by the processor, cause the recipient computing system to: receive, from a remote computing system, a composite encryptedkey, the recipient computing system and the remote computing system using a number N of different, independent encryption algorithms using N key pairs, each key pair of the N key pairs including an encryption key and a decryption key, the encryption key of all of the N key pairs being included in a certificate, wherein the composite encryptedkey includes N-1 encrypted secrets and encrypted encoded content and N is an integer greater than or equal to two; decrypt, at the recipient computing system, each of the N-1 secrets with an associated one of N-1 associated encryption algorithms of the N encryption algorithms, wherein decrypting each of the N-1 secrets includes use of N-1 decryption keys; decrypt, at the recipient computing system, the encoded content with a remaining Nth encryption algorithm and Nth decryption key of the N encryption algorithms; and perform, at the recipient computing system, an exclusive-or operation on the encoded content with each of the N-1 secrets to decode the content.

DETAILED DESCRIPTION

Figure 1:
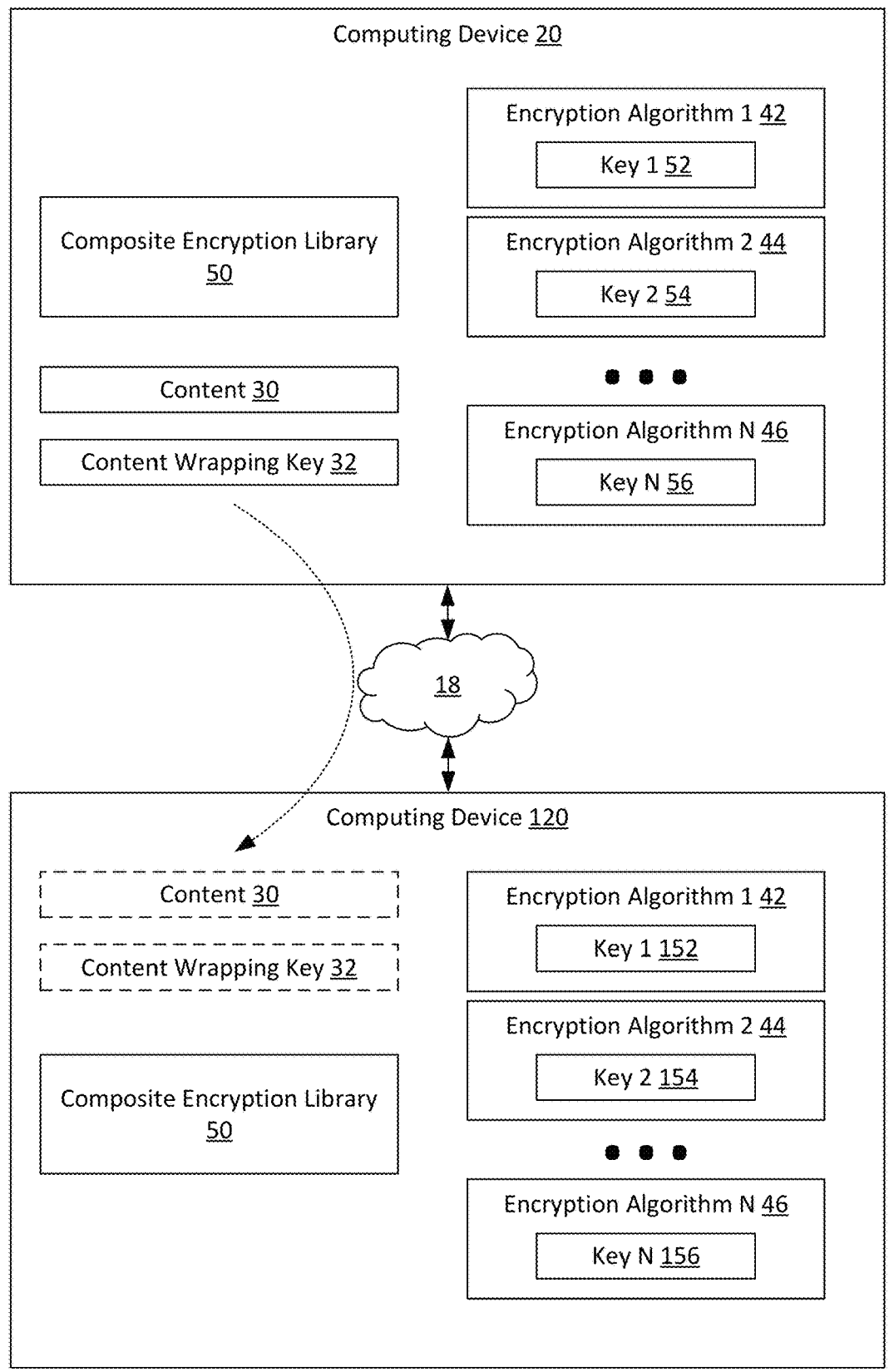
FIG. 1 illustrates an example environment in which a transmitting and receiving computing system reside, in which aspects of the present disclosure may be implemented.

As briefly described above, embodiments of the present invention are directed to a composite encryption scheme in which a sender and recipient each have multiple asymmetric encryption keys that are used according to different, independent encryption algorithms. The composite encryption scheme requires use of all of the encryption keys to successfully retrieve the encrypted content. In some examples, a secret sharing scheme is provided that uses an exclusive-or (XOR) operation to combine a set of one or more generated secrets with content. The resulting encoded content may be encrypted using one of the independent encryption algorithms, while the generated secrets are each encrypted using different ones of the encryption algorithms. A recipient may then decrypt each secret and the encoded content using appropriate encryption algorithms, subsequently using the decrypted secrets to retrieve the original content.

The composite encryption scheme proposed herein ensures that a recipient may only be able to successfully reconstitute content if all encryption algorithms are available and used appropriately. Accordingly, the composite encryption scheme ensures security of content despite potential compromise of one or more (but not all) of the encryption algorithms.

In the context of the present disclosure, an encryption algorithm generally is information object class for identifying the type of cryptographic operation to be performed. An individual or component, algorithm, is a single algorithm which may be contained within a composite algorithm, which a composite algorithm represents a sequence of two or more component algorithms. Additionally, an encryption key may represent an object that is used in encryption in accordance with a given algorithm, while a composite encryption key is a structure that contains a sequence of encryption keys and/or secrets used to derive content, such as a content encryption key. A composite encryption key may contain, as noted below, information other than such individual encryption keys, including information describing those encryption keys and other cryptographic metadata necessary for successful decryption of the content.

While complex, nested encryption schemes may be possible, such schemes may require a significant amount of computation to perform nested encryption. Furthermore, because of the nested nature of such encryption, the encryption and decryption operations must be performed serially, rather than in parallel, which further increases the amount of time required for encryption and recovery of data as part of a transmission. Such schemes also often result in the content increasing in size as each encryption scheme is applied, thereby gradually increasing the computational complexity and size of the content to be stored and/or transmitted. Accordingly, the composite encryption scheme described herein is computationally simple compared to such potential enveloped or nested encryption schemes, which use multiple encryption keys to sequentially encrypt content of potentially increasing (or varying) size.

Referring first to FIG. 1, an example environment 10 is illustrated in which a transmitting and receiving computing system reside. The example environment 10 is one potential environment in which aspects of the present disclosure may be implemented.

In the example shown, computing devices 20, 120 are communicatively interconnected via a network 18, such as a public network, e.g., the Internet. In the example described herein, computing device 20 may be referred to as a transmitting computing device or first computing device, and computing device 120 may be referred to as a second computing device or receiving computing device. However, other arrangements are possible, such as use of more than two, or in fact only one computing device.

As illustrated, both computing devices 20, 120 implement a plurality of encryption algorithms. In the example shown, computing devices 20, 120 implement encryption algorithms 1-N, with three such algorithms 42, 44, 46 depicted. It is noted that the computing devices 20, 120 do not need to implement a complete set of the same encryption algorithms, but instead the algorithms 1-N represent those which are common between the two devices.

In the example shown, computing device 20 stores content 30, and also has a content wrapping key 32. The content wrapping key 32 may be a symmetric key used for content encryption. Accordingly, the content wrapping key 32 may also be referred to as a content encryption key (CEK). In some circumstances, the computing device 20 may wish to encrypt the content 34 transport between computing devices 20, 120. In such circumstances, it may be advantageous to encrypt the content 30 using the content wrapping key 32. Alternatively, the content 30 may be encrypted using one or more of the encryption algorithms 42-46. When the content 30 is of significant size, it may be computationally complex to encrypt that content using multiple encryption algorithms.

Accordingly, it may instead be advantageous to secure the content wrapping key 32, provide that secured content wrapping key to the computing device 120, and subsequently use the content wrapping key for encrypting and decrypting the content before/after transport between computing devices 20, 120.

In an example embodiment, the content wrapping key 32 may be an AES symmetric key, such as a 256 bit AES key. However, in other examples, other types of encryption keys or other bit lengths (128 bits to 512 bits or up to 1024 bits in some instances) may be used. Regardless of the specific type or size of key used as the content wrapping key 32, in general the content wrapping key will be of a known size (bit length), such that same-sized, randomly-generated secrets may be formed for use in encoding the content wrapping key 32 as described in the examples of FIGS. 3-4, below.

The encryption algorithms 42-46 are generally independent, different encryption algorithms that may be used for encrypting content. That is, each of the encryption algorithms does not require execution or use of any of the other encryption algorithms, and in some instances the encryption algorithms perform different cryptographic functions to encrypt data. In some examples, each of encryption algorithms 42-46 may comprise asymmetric encryption algorithms using asymmetric keys (e.g., a public key and a private key forming a key pair). In other examples, symmetric keys may be used. In the implementation as depicted, each encryption algorithm 42-46 has an associated key 52-56 at computing device 20, and the same encryption algorithms 42-46 at computing device 120 may have keys 152-156. Keys 152-156 may be the same as keys 52-56, or may be complementary to those keys in the case of an asymmetric (public-private) key pair.

The encryption algorithms 42-46 may be any of a variety of encryption algorithms. In some examples, the encryption algorithms 42-46 may include one or more "post quantum" encryption algorithms. Example encryption algorithms may include a lattice-based encryption algorithm; code-based cryptography; or the RSA algorithm. However, the list of possible encryption algorithms that are useable is not so limited. Also, it is recognized that over time the encryption algorithms 42-46 may change, and therefore the set of common encryption algorithms between computing devices 20, 120 may be reassessed at the time of transport of the content (e.g., the content wrapping key 32).

In the example shown, each of computing devices 20, 120 includes a composite encryption library 50. The composite encryption library stores instructions which, when executed, assess available encryption algorithms at the respective computing devices, and coordinates a composite encryption scheme in accordance with examples described herein. In particular, the composite encryption library 50 may utilize encryption algorithms 42-46 to generate a composite encryption key from a combination of encrypted secrets and an encrypted, encoded version of the content wrapping key 32. The composite encryption library 50 will also include processes for using public keys of multiple different encryption algorithms 42-46 and use those keys together in a single composite encryption operation. Specific processes for forming a composite encryption key from content, such as the content wrapping key 32, as well as decomposing and decrypting the composite encryption key to retrieve such content, are described below in conjunction with FIGS. 3-6.

Figure 2:
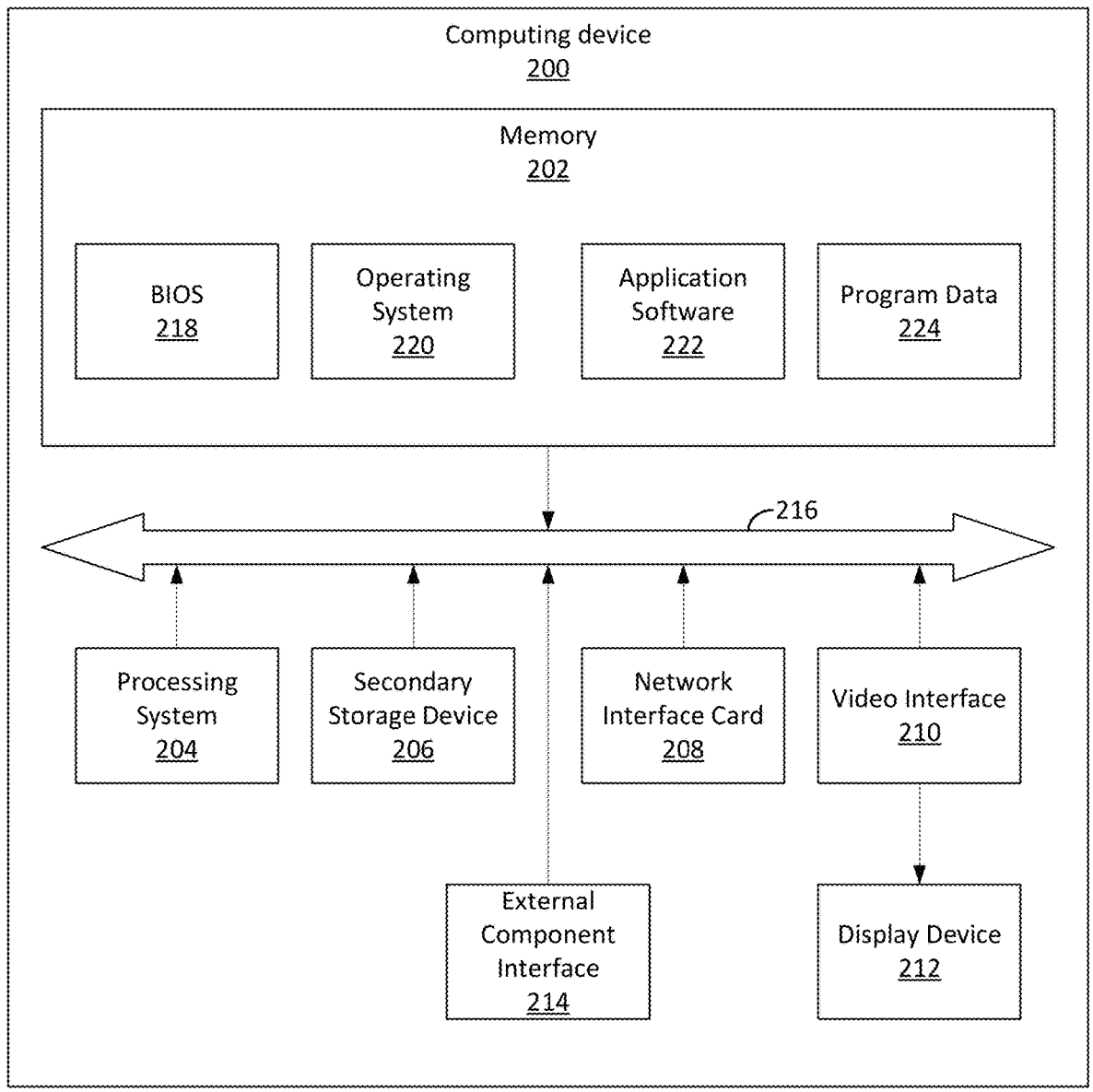
FIG. 2 is a block diagram of a computing device with which aspects of the present disclosure may be implemented.

FIG. 2 illustrates an example computing device with which aspects of the present disclosure can be implemented. The computing device 200 can be used, for example, to implement computing devices 20, 120 or any other computing device useable as described above in connection with FIG. 1.

In the example of FIG. 2, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media, and generally includes at least some tangible media. In some embodiments, the memory 202 is implemented using entirely non-transitory media.

The processing system 204 includes one or more processing units, or programmable circuits. A processing unit is a physical device or article of manufacture comprising one or more integrated circuits that selectively execute software instructions. In various embodiments, the processing system 204 is implemented in various ways. For example, the processing system 204 can be implemented as one or more physical or logical processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid-state memory devices, and/or other types of tangible computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

In optional embodiments where included in the computing device 200, the video interface 210 enables the computing device 200 to output video information to the display unit 212. The display unit 212 can be various types of devices for displaying video information, such as an LCD display panel, a plasma screen display panel, a touch-sensitive display panel, an LED screen, a cathode-ray tube display, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 214 enables the computing device 200 to communicate with external devices.

For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communication medium 216 facilitates communication among the hardware components of the computing device 200. The communications medium 216 facilitates communication among the memory 202, the processing system 204, the secondary storage device 206, the network interface card 208, the video interface 210, and the external component interface 214. The communications medium 216 can be implemented in various ways. For example, the communication medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 202 stores various types of data and/or software instructions. The memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

Although particular features are discussed herein as included within an electronic computing device 200, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 200 of FIG. 2, the computer-readable instructions are stored on devices that include non-transitory media. In particular embodiments, the computer-readable instructions are stored on entirely non-transitory media.

Figure 3:
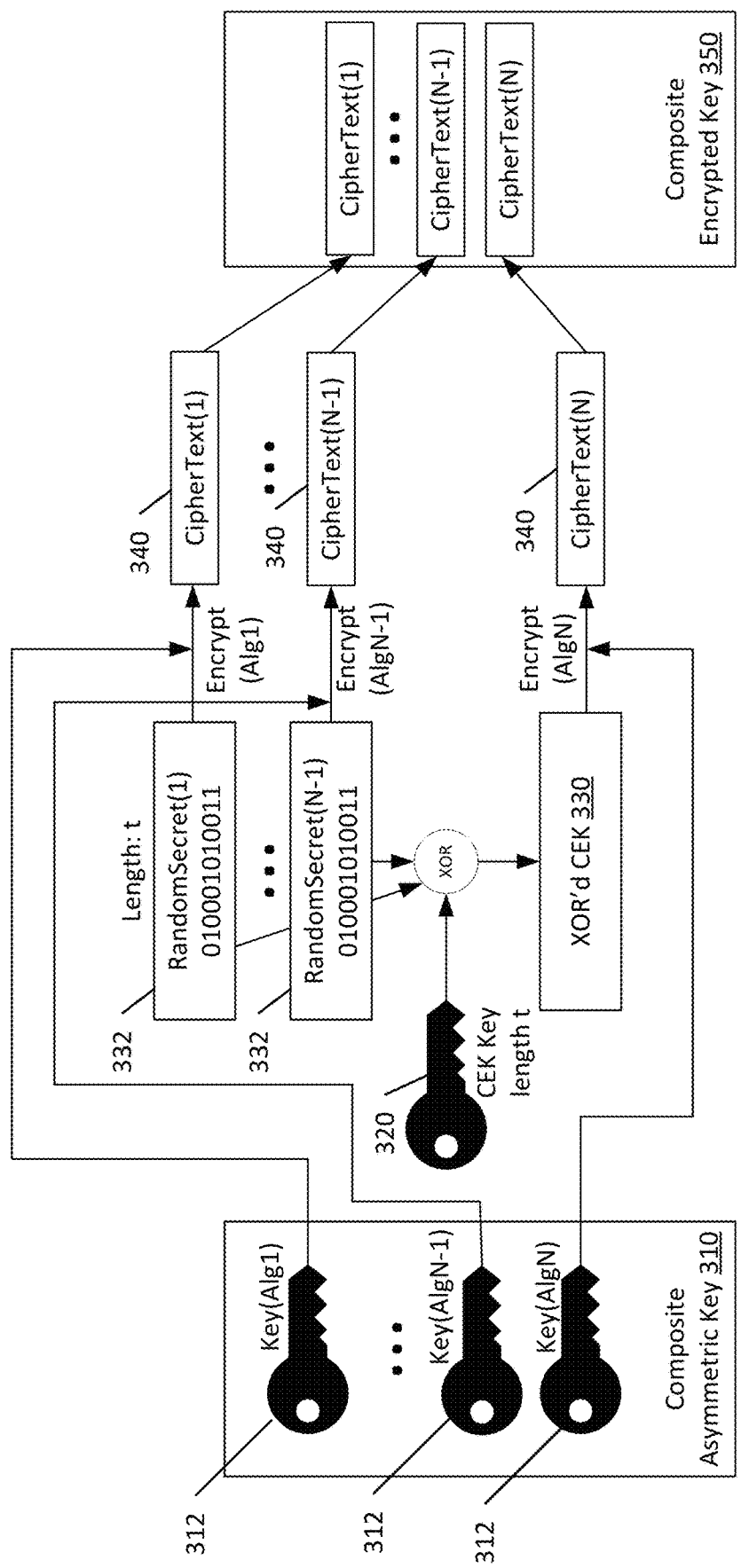
FIG. 3 is a logical diagram illustrating a manner of generating a composite encrypted key usable to protect content, in accordance with example embodiments of the present disclosure.

FIG. 3 is a logical diagram 300 illustrating a manner of generating a composite encrypted key usable to protect content, in accordance with example embodiments of the present disclosure. The diagram 300 illustrates a method of encrypting content, such as either content 30 or content wrapping key 32 of FIG. 1, using multiple encryption algorithms and keys for communication with another computing device. in particular, the diagram 300 illustrates a method of using multiple encryption algorithms to perform key transport of a content encryption key 320, representing an example of the content wrapping key 32. Specifically, the diagram 300 illustrates creating a composite encrypted key 350 based on the content encryption key 320 and using each of the multiple encryption algorithms. The composite encrypted key 350 may then be transmitted, for example from a first computing device 20 to a second computing device 120, as seen in FIG. 1.

In the example shown, a composite key 310 is shown (also referred to herein as a "composite encrypted key"), which includes a plurality of encryption keys 312. Each of the encryption keys 312 is associated with a different encryption algorithm, denoted Alg1-AlgN. Accordingly, each of the different encryption keys is denoted as Key (Alg1) through Key(AlgN). In example implementations, two or more encryption keys 312 may be used as part of the methods described herein. The diagram 300 shows use of N keys, with three of those N keys explicitly depicted. In example embodiments, the encryption keys 312 correspond to public keys of a public-private key pair used in each of N different encryption algorithms.

Once a number of different encryption algorithms N is determined, the method as shown includes generating N-1 different randomly generated secrets 332. Each of the secrets 332, denoted RandomSecret(1) through RandomSecret(N-1), has a same length, and is of the same length as the content encryption key 320. Accordingly, in typical embodiments where the content encryption key 320 is a 256 bit AES key, each of the secrets 332 will be a 256 bit random value. As noted above, if the content length (content encryption key length) varies, such as between 128 and 1024 bits, the lengths of the secrets will also match that content length.

In the example shown, the content encryption key 320 is encoded using each of the secrets 332 using an exclusive-or operation to generate encoded content, shown as the encoded content encryption key 330. That is, a bitwise exclusive-or operation may be performed on the content encryption key 320, as follows:

CEK XOR RandomSecret(1) . . . XOR RandomSecret(N-1)

Each of the secrets 332 is associated with a particular one of the encryption algorithms. For example, secret RandomSecret(1) may be associated with a first encryption algorithm Alg1 and a first key (e.g., Key(Alg1)) used by that encryption algorithm, a second secret RandomSecret(2) may be associated with a second encryption algorithm Alg2 and a second key (e.g., Key(Alg2)) used by that second encryption algorithm, and so on through RandomSecret(N-1) being associated with AlgN-1 and Key(AlgN-1). Note, no random secret is generated for one of the encryption algorithms and keys (e.g., AlgN and Key(AlgN)) identified as used to generate the composite encryption key 350.

In the example shown, each of the secrets 332 is encrypted using the associated encryption algorithm and key 312 that is used as part of that encryption algorithm. This will generate a ciphertext 340 for each of the N-1 secrets (shown as CipherText(1) through CipherText(N-1)), also referred to herein as encrypted secrets. Additionally, the encoded content 330 will be encrypted using the remaining key 312 and algorithm (e.g., AlgN) to form a further ciphertext 340 (e.g., CipherText(N)). Each of the ciphertext's 340 may then be combined into a composite encrypted key 350. In example embodiments, the composite encrypted key 350 may include additional information, such as identities of the encryption or other cryptographic algorithms used, correspondence between the encryption algorithm and the particular ciphertexts included in the composite encrypted key, the lengths of the respective keys used in the encryption algorithms, as well as the length of the content and/or secrets. Other information may be included as well, to the extent required to parse and extract ciphertexts, distinguish the encoded content from the secrets, and associate each with a particular one of the encryption algorithms. The composite encrypted key 350 may then be transmitted to a receiving computing device, such as computing device 120 of FIG. 1.

Figure 4:
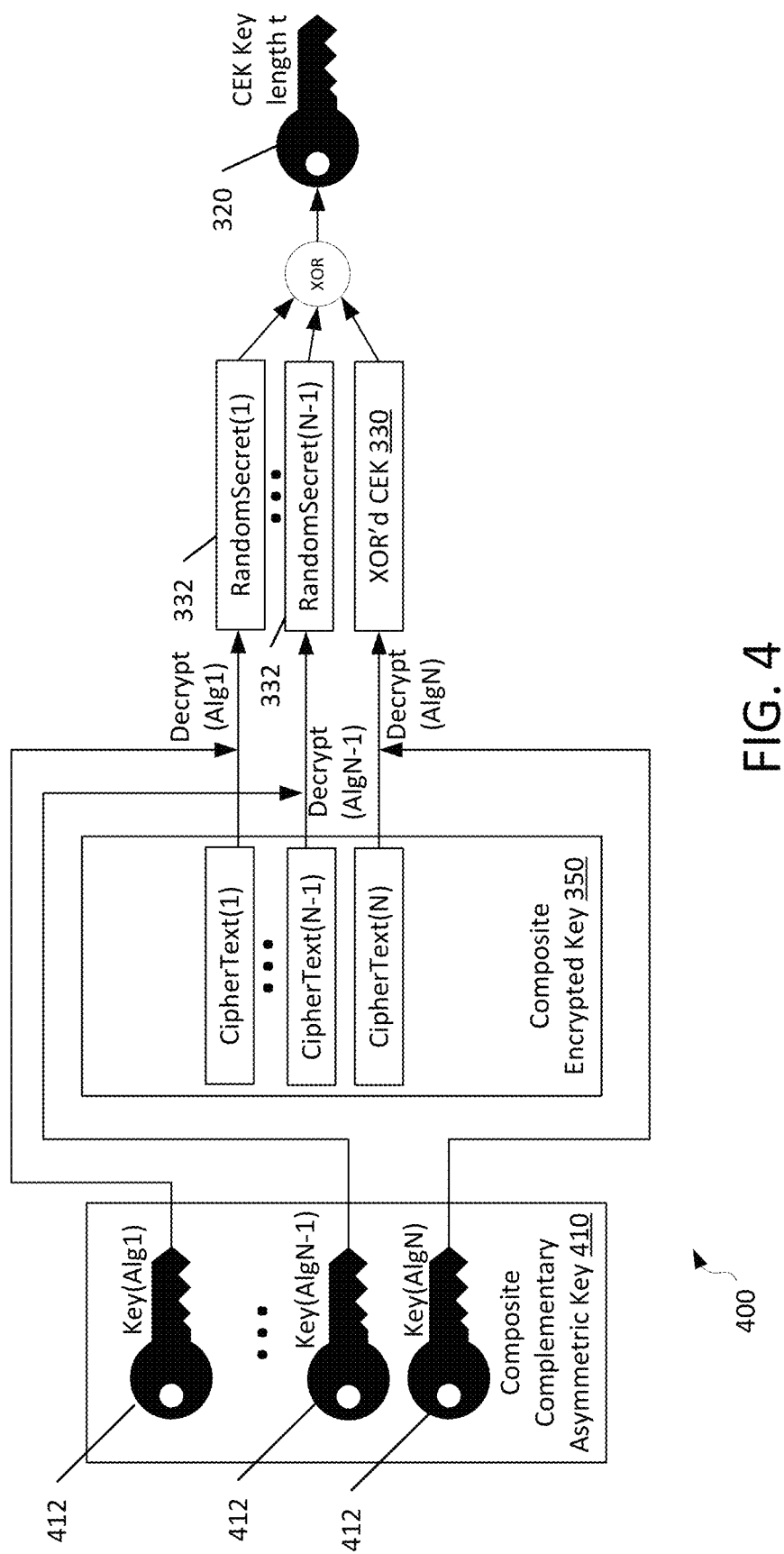
FIG. 4 is a logical diagram illustrating a manner of decomposing a composite encrypted key to obtain content from the composite encrypted key, in accordance with example embodiments of the present disclosure.

FIG. 4 is a logical diagram 400 illustrating a manner of decomposing a composite encrypted key to obtain content from the composite encrypted key, in accordance with example embodiments of the present disclosure. The diagram 400 illustrates a process that may be performed at a receiving computing device, such as computing device 120 of FIG. 1, upon receipt of a composite encrypted key 350 generated in accordance with the process described in conjunction with FIG. 3.

In the example shown, a complementary composite key 410 may be provided at a device receiving the composite encrypted key 350. The complementary composite key 410 includes keys 412 that are complementary to the keys used to encrypt the ciphertexts included in the composite encrypted key 350. For example, the keys 412 may be private keys of public-private key pairs formed with the keys 312 of FIG. 3. For example, a first key 312, denoted as Key(Alg1), may be a public key of a public-private key pair, and a second key 412, also denoted as Key(Alg1), would be its complementary key used in accordance with the same encryption algorithm.

In the example shown, each of the keys 412 may be used to decrypt an associated one of the ciphertexts included in the composite encrypted key 350 according to the respective algorithms with which those keys are used. By decrypting the ciphertexts, each of the N-1 secrets 332, as well as the encoded content, e.g., encoded content encryption key 330, are recovered. The encoded content encryption key 330 may then be exclusive-or'ed with each of the secrets 332, to decode that content encryption key, thereby obtaining the original content encryption key 320. That is, a bitwise exclusive-or operation may be performed as follows, to recover the content:

Content=EncodedContent XOR RandomSecret(1) . . . XOR RandomSecret(N-1)

Referring to FIGS. 3-4 generally, although the overall process of creating a composite encrypted key 350 from a content encryption key 320 and recovering the content encryption key 320 are described specifically with respect to use of an encryption key (e.g., and a symmetric key such as an AES key) it is noted that the same approach may be used with any type of content desired to be secured using multiple, independent encryption algorithms, which has a known, constant length such that same-length secrets may be generated for use in encoding the content.

Figure 5:
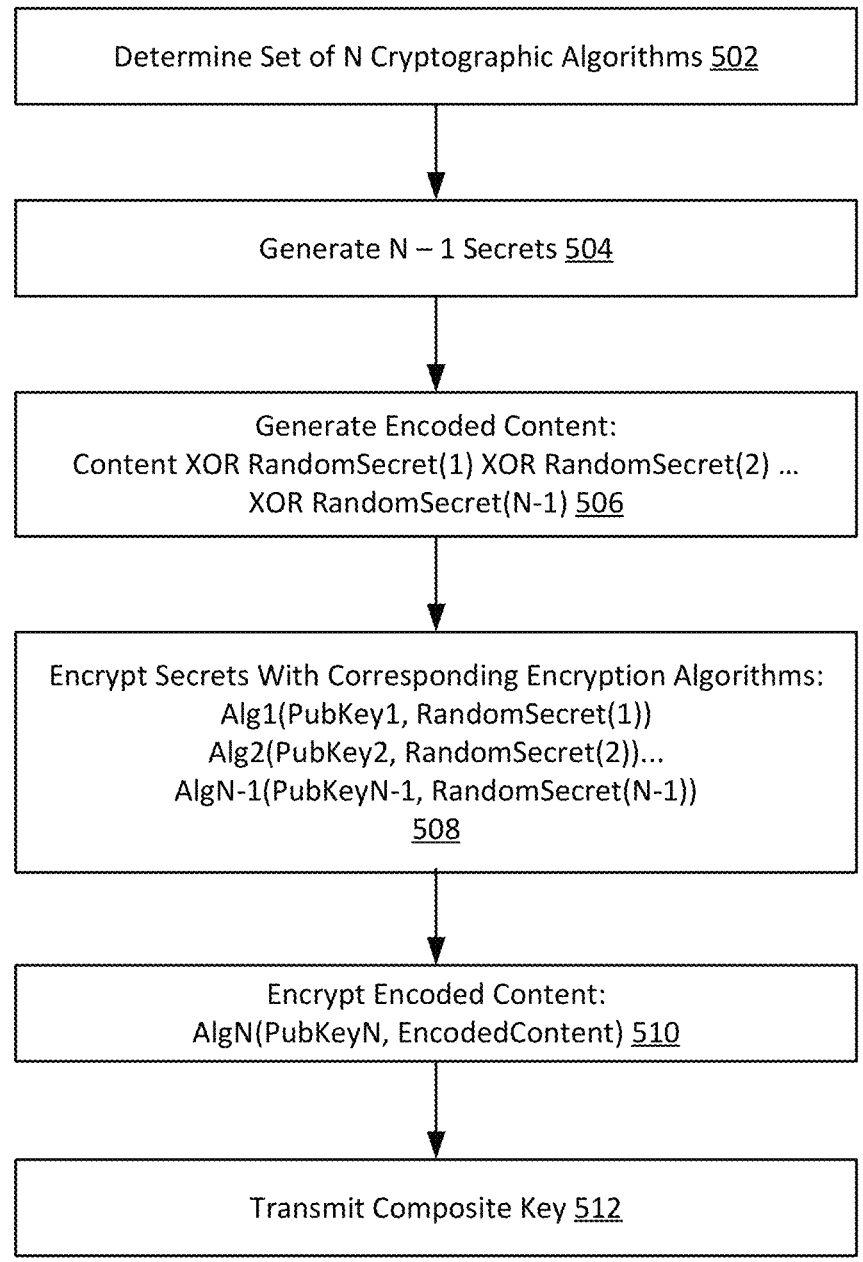
FIG. 5 is a flowchart of a method of securely transmitting content between a first computing system and a second computing system, in accordance with an example embodiment.
Figure 6:
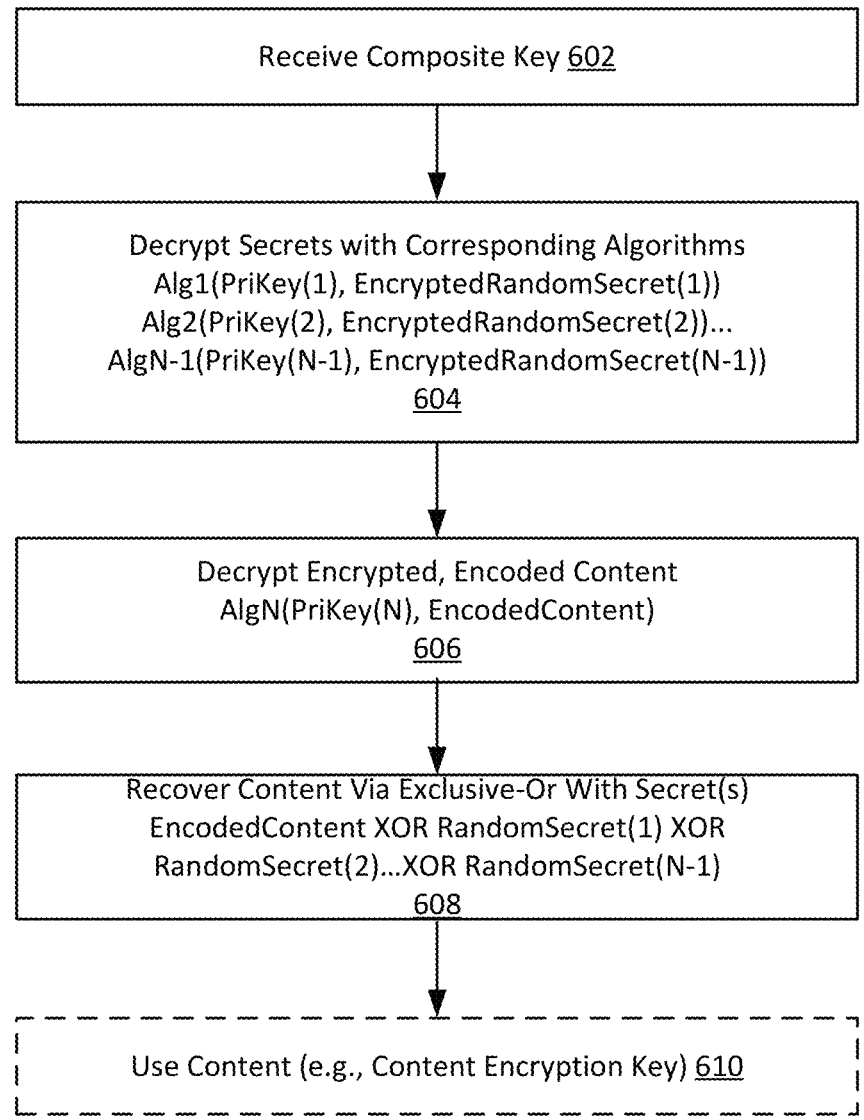
FIG. 6 is a flowchart of a method of receiving and reconstructing content from a composite encrypted key received at a second computing system from a first computing system, in accordance with an example embodiment.

Referring now to FIGS. 5-6, a set of generalized methods are described for securely transmitting content between a first computing system and a second computing system, and subsequently receiving and reconstructing the content from a composite encrypted key. FIG. 5 is a flowchart of a method 500 of securely transmitting content between a first computing system and a second computing system, in accordance with an example embodiment. The method 500 may represent a generalized approach to that seen in FIG. 3, and may be used in accordance with transmitting content between two computing devices, such as computing devices 20, 120.

In the example shown, the method 500 includes determining a set of N cryptographic algorithms that are used by a sending and receiving computing system (step 502). The set of cryptographic algorithms may include two or more such cryptographic algorithms. In some instances, three or more such cryptographic algorithms may be used. In example embodiments, exchange of information regarding the identity of supported cryptographic algorithms may be performed in accordance with existing standards. For example, when a transmitting computing device and receiving computing device use Public Key Infrastructure (PM), the transmitting computing device may use public keys implemented for use with a variety of different encryption algorithms, with such public keys being provided in accordance with X.509 key exchange standards (pursuant to RFC 5280). In such an instance, the transmitting computing device (e.g., computing device 20 of FIG. 1) may retrieve public keys from a digital certificate which is certified by a trusted third party (typically a certificate authority) and for which the receiving computing device possesses the corresponding private keys. The transmitting computing device may then select those encryption algorithms and keys that it also supports, thereby ensuring encryption compatibility between devices 20, 120. Accordingly, a sender and recipient may be provisioned with complementary keys (e.g., a public-private key pair) for use with one or more encryption algorithms.

The method 500 further includes generating N-1 secrets (step 504). Generating the N-1 secrets may include determining a length of content that will be transmitted between first and second computing devices, and generating secrets of equal length (size) to that content. Any of a variety of types of random number generators able to generate random binary numbers of a predetermined length may be used to generate the secrets.

In the example shown, the method 500 also includes generating encoded content (step 506). Generating encoded content may be accomplished by performing a bitwise exclusive-or operation on the content and each of the randomly generated secrets. This will result in encoded content having the same length as the original content, but encoded with each of the N-1 randomly generated secrets.

The method 500 further includes encrypting each of the secrets with a corresponding, or selected, one of the N cryptographic algorithms. That is, because there will be one fewer secret than cryptographic algorithms, each of secrets one through N-1 will be encrypted using a different one of cryptographic algorithms 1 though AlgN-1. Additionally, the remaining unused one of the N encryption algorithms (e.g., AlgN) is used to encrypt the encoded content (step 510). It is noted that the encryption processes of steps 508, 510 may be used with encryption keys that are associated with the related algorithms that are used. As noted above, the encryption keys may be an asymmetric key, such as a public key of a public-private key pair.

Once the encoded content and secrets are encrypted, in example embodiments a series of cipher texts are created, and included in a composite encrypted key, such as composite encrypted key 350 described above. The composite key may then be transmitted from the first computing system to a second, or receiving, computing system (step 512).

FIG. 6 is a flowchart of a method 600 of receiving and reconstructing content from a composite encrypted key (e.g., from composite encrypted key 350) received at a second computing system from a first computing system, in accordance with an example embodiment. The method 600 may be used, for example, in association with key transport between two computing systems such as computing systems 20, 120 of FIG. 1.

In the example shown, the method 600 includes receiving the composite key (step 602). The key may be a composite encryption key 350, including a plurality of ciphertexts as seen in FIGS. 3-4. As noted above, there will be one ciphertext per different encryption algorithm used as part of the key transport process, for a total of N different encryption algorithms. In the example shown, the method 600 further includes decrypting the secrets (step 604) and decrypting the encoded content (step 606). Decrypting the secrets can include, for example, obtaining information from the composite encryption key 350 identifying the particular encryption algorithms used to form the ciphertexts, and utilizing that encryption algorithm, and associated encryption key for decrypting the secrets and encoded content. This can include, for example, using a private key of a public-private key pair for one or more, or each, of the encryption algorithms to obtain the secrets and the encoded content.

In the example shown, the method 600 also includes recovering the content from the encoded content by performing a further exclusive-or operation on the encoded content using each of the secrets (step 608). Once the content is recovered, that content may subsequently be used as needed by the receiving computing system (step 610). In the case that the content is a content encryption key such as key 320 or key 32, use of the content can include use of the key to encrypt or decrypt other content (e.g., content that is larger in size) for secure transmission between two computing systems that now share the key.

Referring to FIGS. 1-6 generally, although the examples described above relate to sharing of a key as content between two computing systems, it is recognize that other applications of the composite encryption scheme described herein are also possible. For example, the composite encryption key 350 may simply be used for secure storage of content or a content encryption key, or may be used in transmission of content to a number of other receiving devices. Additionally, where the original content is not an encryption key but is of sufficiently small size that it can be efficiently encoded with same size secrets the content may be used in many other contexts, for example representing a certificate or password or other user credential, or even a message passed between computing systems for which high security is required. By using the combination of encryption algorithms, it is possible to ensure that data is secured despite the possibility of one or more of those encryption algorithms being compromised, and with significant computational efficiency.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of securing data for transmission between a first computing system and a second computing system, the method comprising:
   determining, at a first computing system, a number N of different, independent encryption algorithms used at the first computing system and at a second computing system, wherein N is an integer greater than or equal to two, the N encryption algorithms being associated with N encryption keys received in a certificate;
   generating a different secret associated with an associated encryption algorithm for each of N-1 of the N encryption algorithms, thereby forming N-1 secrets;
   performing an exclusive-or operation on a combination of a content and the N-1 secrets to form encoded content;
   encrypting each of the N-1 secrets with the associated encryption algorithm from among the N-1 encryption algorithms using N-1 encryption keys of the N encryption keys to form encrypted N-1 secrets;
   encrypting the encoded content with the Nth encryption algorithm using the Nth encryption key to form encrypted encoded content; and
   transmitting, to the second computing system, a composite encrypted key comprising each of the encrypted N-1 secrets and the encrypted encoded content.

2. The method of claim 1, wherein the content comprises a content encryption key.

3. The method of claim 1, wherein encrypting each of the N-1 secrets with the associated encryption algorithm includes encrypting each of the N-1 secrets using a public key of a public-private key pair used in the associated encryption algorithm.

4. The method of claim 1, further comprising:
   receiving, at the second computing system, the composite encrypted key;
   decrypting, at the second computing system, each of the N-1 secrets with the associated encryption algorithm associated with the respective one of the N-1 secrets, wherein decrypting each of the N-1 secrets includes use of N-1 decryption keys;
   decrypting, at the second computing system, the encoded content with the Nth encryption algorithm using an Nth decryption key; and
   performing, at the second computing system, an exclusive-or operation on the encoded content with each of the N-1 secrets to decode the content.

5. The method of claim 4, wherein decrypting each of the N-1 secrets with the associated encryption algorithm includes decrypting each of the N-1 secrets using a private key of a public-private key pair used in the associated encryption algorithm.

6. The method of claim 4, wherein receiving the composite encrypted key comprises receiving the composite encrypted key from the first computing system via a public network.

7. The method of claim 1, wherein N is greater than or equal to three, and each of the N-1 secrets has a size equal to a size of the content.

8. The method of claim 7, wherein the size is greater than or equal to 128 bits and less than or equal to 512 bits.

9. The method of claim 1, wherein the certificate comprises an X.509 certificate that is certified by a third party.

10. The method of claim 1, wherein the N encryption algorithms include one or more post-quantum encryption algorithms selected from a group comprising: a lattice-based encryption algorithm; a code-based encryption algorithm; or the RSA algorithm.

11. A composite encryption system comprising:
a first computing system including a processor communicatively coupled to a memory, the memory storing instructions which, when executed by the processor, cause the first computing system to:
determine a number N of different, independent encryption algorithms used at the first computing system and at a second computing system, wherein N is an integer greater than or equal to two, the N encryption algorithms being associated with N encryption keys received in a certificate;
generate a different secret associated with an associated encryption algorithm for each of N-1 of the N encryption algorithms, thereby forming N-1 secrets;
perform an exclusive-or operation on a combination of a content and the N-1 secrets to form encoded content;
encrypt each of the N-1 secrets with the associated encryption algorithm from among the N-1 encryption algorithms using N-1 encryption keys of the N encryption keys to form encrypted N-1 secrets;
encrypt the encoded content with the Nth encryption algorithm using the Nth encryption key to form encrypted encoded content; and
transmit, to the second computing system, a composite encrypted key comprising each of the encrypted N-1 secrets and the encrypted encoded content.

12. The composite encryption system of claim 11, further comprising the second computing system communicatively coupled to the first computing system via a public network.

13. The composite encryption system of claim 12, wherein the second computing system includes a second processor communicatively coupled to a second memory storing instructions which, when executed by the second processor, cause the second computing system to:
receive, at the second computing system, the composite encrypted key;
decrypt, at the second computing system, each of the N-1 secrets with the associated encryption algorithm associated with the respective one of the N-1 secrets, wherein decrypting each of the N-1 secrets includes use of N-1 decryption keys;
decrypt, at the second computing system, the encoded content with the Nth encryption algorithm using an Nth decryption key; and
performing, at the second computing system, an exclusive-or operation on the encoded content with each of the N-1 secrets to decode the content.

14. The composite encryption system of claim 11, wherein the content comprises a content encoding key, the content encoding key being a symmetric key used to encrypt content transmitted between the first computing system and the second computing system.

15. A method of securely transmitting content between a first computing system and a second computing system, the method comprising:
receiving, at a second computing system from a first computing system, a composite encrypted key, the second computing system and the first computing system using a number N of different, independent encryption algorithms using N key pairs, each key pair of the N key pairs including an encryption key and a decryption key, the encryption key of all of the N key pairs being included in a certificate, wherein the composite encrypted key includes N-1 encrypted secrets and encrypted encoded content and N is an integer greater than or equal to two;
decrypting, at the second computing system, each of the N-1 encrypted secrets with an associated one of N-1 associated encryption algorithms of the N encryption algorithms using N-1 of the N decryption keys to obtain N-1 secrets;
decrypting, at the second computing system, the encrypted encoded content with a remaining Nth encryption algorithm and Nth decryption key of the N encryption algorithms to obtain encoded content; and
performing, at the second computing system, an exclusive-or operation on the encoded content with each of the N-1 secrets to decode the content.

16. The method of claim 15, wherein decrypting each of the N-1 secrets with the associated encryption algorithm and decryption key includes decrypting each of the N-1 secrets using a private key of a public-private key pair used in the associated encryption algorithm.

17. The method of claim 15, wherein the content comprises a content encryption key and each of the N-1 secrets has a size equal to a size of the content encryption key.

18. The method of claim 15, wherein each of the N-1 encrypted secrets is encrypted with a different one of the N-1 associated encryption algorithms, and the encrypted encoded content is encrypted with an encryption algorithm from among the N encryption algorithms other than the N-1 encryption algorithms.

19. The method of claim 15, wherein decrypting each of the N-1 secrets with the associated encryption algorithm and decryption key includes decrypting each of the N-1 secrets using a private key of a public-private key pair used in the associated encryption algorithm.

20. A system comprising:
a recipient computing system including a processor communicatively coupled to a memory, the memory storing instructions which, when executed by the processor, cause the recipient computing system to:
receive, from a remote computing system, a composite encrypted key, the recipient computing system and the remote computing system using a number N of different, independent encryption algorithms using N key pairs, each key pair of the N key pairs including an encryption key and a decryption key, the encryption key of all of the N key pairs being included in a certificate, wherein the composite encrypted key includes N-1 encrypted secrets and encrypted encoded content and N is an integer greater than or equal to two;
decrypt, at the recipient computing system, each of the N-1 encrypted secrets with an associated one of N-1 associated encryption algorithms of the N encryption algorithms using N-1 of the N decryption keys to obtain N-1 secrets;

decrypt, at the recipient computing system, the encrypted encoded content with a remaining Nth encryption algorithm and Nth decryption key of the N encryption algorithms to obtain encoded content; and perform, at the recipient computing system, an exclusive-or operation on the encoded content with each of the N-1 secrets to decode the content.

21. The system of claim 20, further comprising the remote computing system, wherein the recipient computing system and the remote computing system are communicatively connected via a public network.

\* \* \* \* \*